(12) United States Patent
Jeoung et al.

(10) Patent No.: US 9,853,278 B2
(45) Date of Patent: Dec. 26, 2017

(54) SECONDARY BATTERY

(71) Applicant: SAMSUNG SDI CO., LTD., Yongin-si, Gyeonggi-do (KR)

(72) Inventors: Jin-Man Jeoung, Yongin-si (KR); Jung-Woo An, Yongin-si (KR); Jeong-Tae Kim, Yongin-si (KR); Dae-Seop Lim, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 17 days.

(21) Appl. No.: 14/536,087

(22) Filed: Nov. 7, 2014

(65) Prior Publication Data
US 2015/0194639 A1  Jul. 9, 2015

(30) Foreign Application Priority Data

Jan. 6, 2014 (KR) .................. 10-2014-0001497

(51) Int. Cl.
*H01M 2/02* (2006.01)
*H01M 4/58* (2010.01)
(Continued)

(52) U.S. Cl.
CPC ............... *H01M 2/26* (2013.01); *H01M 4/13* (2013.01); *H01M 10/0468* (2013.01); *H01M 10/058* (2013.01); *H01M 10/0525* (2013.01); *H01M 2/263* (2013.01); *H01M 2/30* (2013.01); *H01M 4/587* (2013.01); *H01M 4/5825* (2013.01); *Y02T 10/7011* (2013.01)

(58) Field of Classification Search
CPC .......... H01M 2/30; H01M 2/26; H01M 2/263; H01M 4/5825; H01M 4/587; H01M 4/13; H01M 10/0468; H01M 10/0525; H01M 10/058
USPC ........................................... 429/94, 179, 185
See application file for complete search history.

(56) References Cited

U.S. PATENT DOCUMENTS

| | | | | |
|---|---|---|---|---|
| 6,376,121 | B1 * | 4/2002 | Inomata | H01M 2/26 29/623.1 |
| 2005/0214642 | A1 * | 9/2005 | Kim | H01M 2/263 429/211 |

(Continued)

FOREIGN PATENT DOCUMENTS

| JP | 11-111340 | * | 4/1999 | ............ H01M 10/40 |
|---|---|---|---|---|
| JP | 2005-285773 | * | 10/2005 | .............. H01M 2/26 |

(Continued)

*Primary Examiner* — Osei Amponsah
(74) *Attorney, Agent, or Firm* — Lee & Morse, P.C.

(57) ABSTRACT

A secondary battery includes an electrode assembly including a first non-coating portion and a second non-coating portion, a first current collector and a second current collector joined to the first non-coating portion and the second non-coating portion, respectively, a case that accommodates the electrode assembly, and a cap assembly that seals the case. The first current collector includes a first overlapping portion that overlaps and joins the first non-coating portion, the first overlapping portion having a length and a width, and the first non-coating portion having a length and a width. The length of the first overlapping portion is 30% to 70% of the length of the first non-coating portion, and the width of the first overlapping portion is 50% to 70% of the width of the first non-coating portion.

13 Claims, 4 Drawing Sheets

(51) Int. Cl.

| | |
|---|---|
| *H01M 4/136* | (2010.01) |
| *H01M 4/485* | (2010.01) |
| *H01M 2/30* | (2006.01) |
| *H01M 4/131* | (2010.01) |
| *H01M 2/26* | (2006.01) |
| *H01M 4/13* | (2010.01) |
| *H01M 10/04* | (2006.01) |
| *H01M 10/0525* | (2010.01) |
| *H01M 10/058* | (2010.01) |
| *H01M 4/587* | (2010.01) |

(56) References Cited

U.S. PATENT DOCUMENTS

| | | | |
|---|---|---|---|
| 2011/0039152 A1 | 2/2011 | Kim et al. | |
| 2011/0052975 A1* | 3/2011 | Lee | H01M 2/0237 |
| | | | 429/178 |
| 2011/0171516 A1 | 7/2011 | Byun et al. | |
| 2012/0077065 A1* | 3/2012 | Kamiya | H01M 2/06 |
| | | | 429/94 |
| 2012/0189908 A1* | 7/2012 | Tsutsumi | H01G 9/016 |
| | | | 429/179 |
| 2012/0270099 A1 | 10/2012 | Lee et al. | |
| 2012/0321942 A1 | 12/2012 | Ahn | |

FOREIGN PATENT DOCUMENTS

| | | |
|---|---|---|
| KR | 10-2010-0111138 A | 10/2010 |
| KR | 10-2011-0018260 A | 2/2011 |
| KR | 10-2011-0083463 A | 2/2011 |
| KR | 10-2012-0123168 A | 11/2012 |
| KR | 10-2012-0139010 A | 12/2012 |

* cited by examiner

SECONDARY BATTERY

CROSS-REFERENCE TO RELATED APPLICATION

Korean Patent Application No. 10-2014-0001497, filed on Jan. 6, 2014, in the Korean Intellectual Property Office, and entitled: "Secondary Battery," is incorporated by reference herein in its entirety.

BACKGROUND

1. Field

One or more embodiments relate to a secondary battery.

2. Description of the Related Art

A secondary battery is a battery that may be repeatedly charged and discharged, unlike a primary battery, for which recharging is impossible. According to the type of an external device, the secondary battery may be used in the form of a single battery, or in the form of a battery module formed by connecting a plurality of batteries into one unit.

In addition to being used as a power source of small-sized electronic devices, such as a mobile phone and a notebook computer, Secondary batteries may be used in large transportation devices such as hybrid vehicles.

SUMMARY

Embodiments are directed to a secondary battery including an electrode assembly including a first non-coating portion and a second non-coating portion, a first current collector and a second current collector joined to the first non-coating portion and the second non-coating portion, respectively, a case that accommodates the electrode assembly, and a cap assembly that seals the case. The first current collector includes a first overlapping portion that overlaps and joins the first non-coating portion, the first overlapping portion having a length and a width, and the first non-coating portion having a length and a width. The length of the first overlapping portion is 30% to 70% of the length of the first non-coating portion, and the width of the first overlapping portion is 50% to 70% of the width of the first non-coating portion.

The second current collector may include a second overlapping portion that overlaps and joins the second non-coating portion, the second overlapping portion having a length and a width and the second non-coating portion having a length and a width. The length of the second overlapping portion may be 30% to 70% of the length of the second non-coating portion, and the width of the second overlapping portion may be 50% to 70% of the width of the second non-coating portion.

The electrode assembly may include a first electrode plate, a second electrode plate, and a separator between the first and second electrode plates. The first electrode plate may include a first active material portion on which a first active material is applied. The second electrode plate may include a second active material portion on which a second active material is applied.

The first active material may be a transition metal oxide or a PO$_4$-based metallic compound including Li.

The second active material may be soft carbon.

The first and second non-coating portions may be located at respective ends of the electrode assembly. The first current collector may include a first connection unit that is bent from the first overlapping portion in a direction toward the second non-coating portion. The second current collector may include a second connection unit that is bent from the second overlapping portion in a direction toward the first non-coating portion.

The cap assembly may include a cap plate that seals the case. A first external terminal and a second external terminal may be located on the cap plate. The first connection unit may be electrically connected to the first external terminal. The second connection unit may be electrically connected to the second external terminal.

The secondary battery may further include a retainer that prevents movement of the electrode assembly inside the case.

Embodiments are also directed to a secondary battery that includes an electrode assembly that is formed by winding a first electrode plate, a separator and a second electrode plate that are sequentially stacked. The electrode assembly includes a first non-coating portion and a second non-coating portion at respective ends of the electrode assembly, the first non-coating portion having a length and a width and the second non-coating portion having a length and a width, a first current collector that is electrically connected to the first non-coating portion, and a second current collector that is electrically connected to the second non-coating portion. The first current collector may include a first overlapping portion that overlaps the first non-coating portion and is joined to the first non-coating portion by welding, the first overlapping portion having a length and a width, and a first connection unit that is bent perpendicular to the first overlapping portion. The second current collector may include a second overlapping portion that overlaps the second non-coating portion and is joined to the second non-coating portion by welding, the second overlapping portion having a length and a width, and a second connection unit that is bent perpendicular to the second overlapping portion. The length of the first overlapping portion may be 30% to 70% of the length of the first non-coating portion. The width of the first overlapping portion may be 50% to 70% of the width of the first non-coating portion.

The length of the second overlapping portion may be 30% to 70% of the length of the second non-coating portion. The width of the second overlapping portion is 50% to 70% of the width of the second non-coating portion.

The first electrode plate may include a first active material portion on which a first active material is applied, and a first uncoated area at one side of the first active material portion and on which the first active material is not applied. The second electrode plate may include a second active material portion on which a second active material is applied, and a second uncoated area at one side of the second active material portion and on which the second active material is not applied. The first uncoated area and the second uncoated area may be located at opposite sides, respectively, of the separator without overlapping the separator.

The first non-coating portion and the second non-coating portion may be formed by the winding of the first electrode plate, separator, and the second electrode plate.

The first active material may include a transition metal oxide or a PO$_4$-based metallic compound including Li.

The second active material may include one or more selected from natural graphite, artificial graphite, soft carbon, hard carbon, mesophase pitch carbide, and baked coke.

The secondary battery may further include a case that accommodates the electrode assembly, and a cap assembly that seals the case.

The cap assembly may include a cap plate that seals the case, a first external terminal and a second external terminal are located on the cap plate. The first connection unit may be electrically connected to the first external terminal, and the second connection unit may be electrically connected to the second external terminal.

The secondary battery may further include a retainer that prevents movement of the electrode assembly inside the case.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
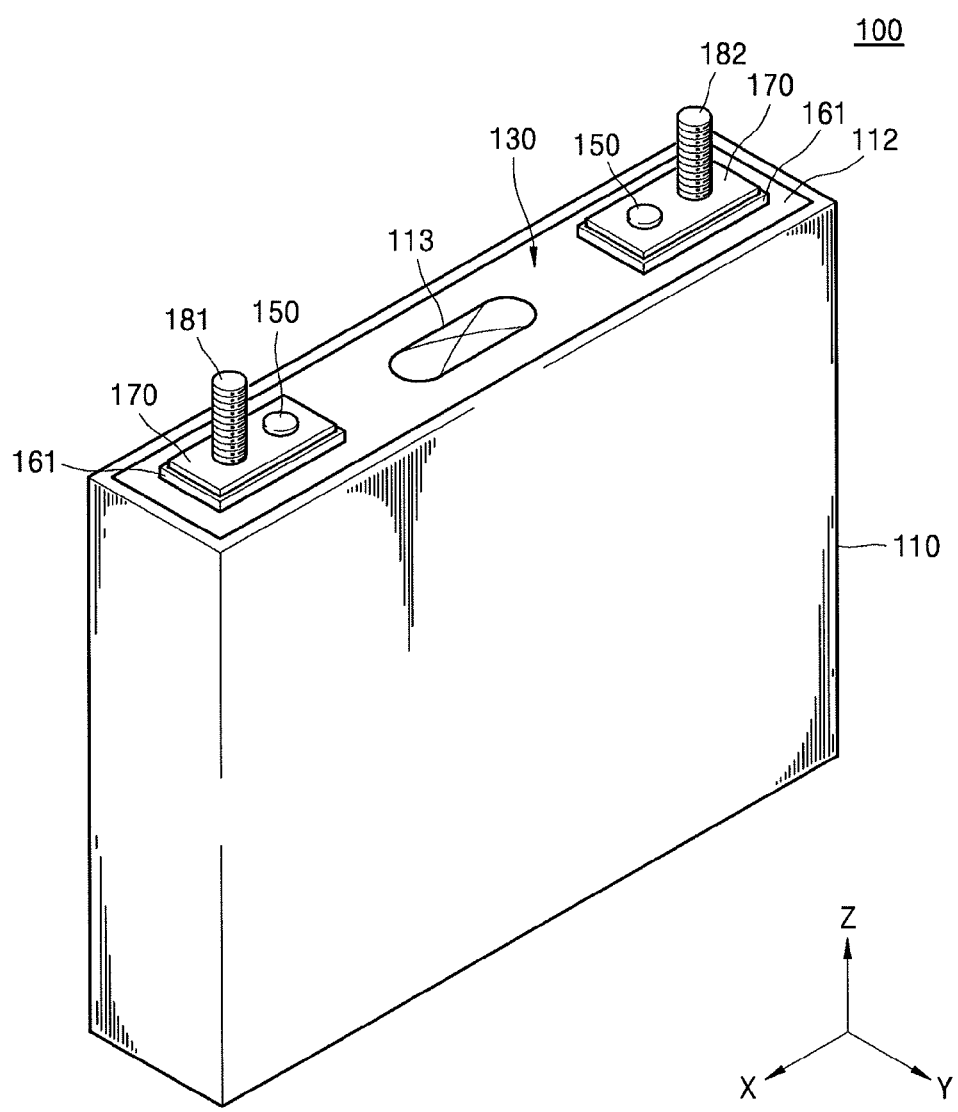
FIG. 1 illustrates a schematic perspective view of a secondary battery according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

Figure 2:
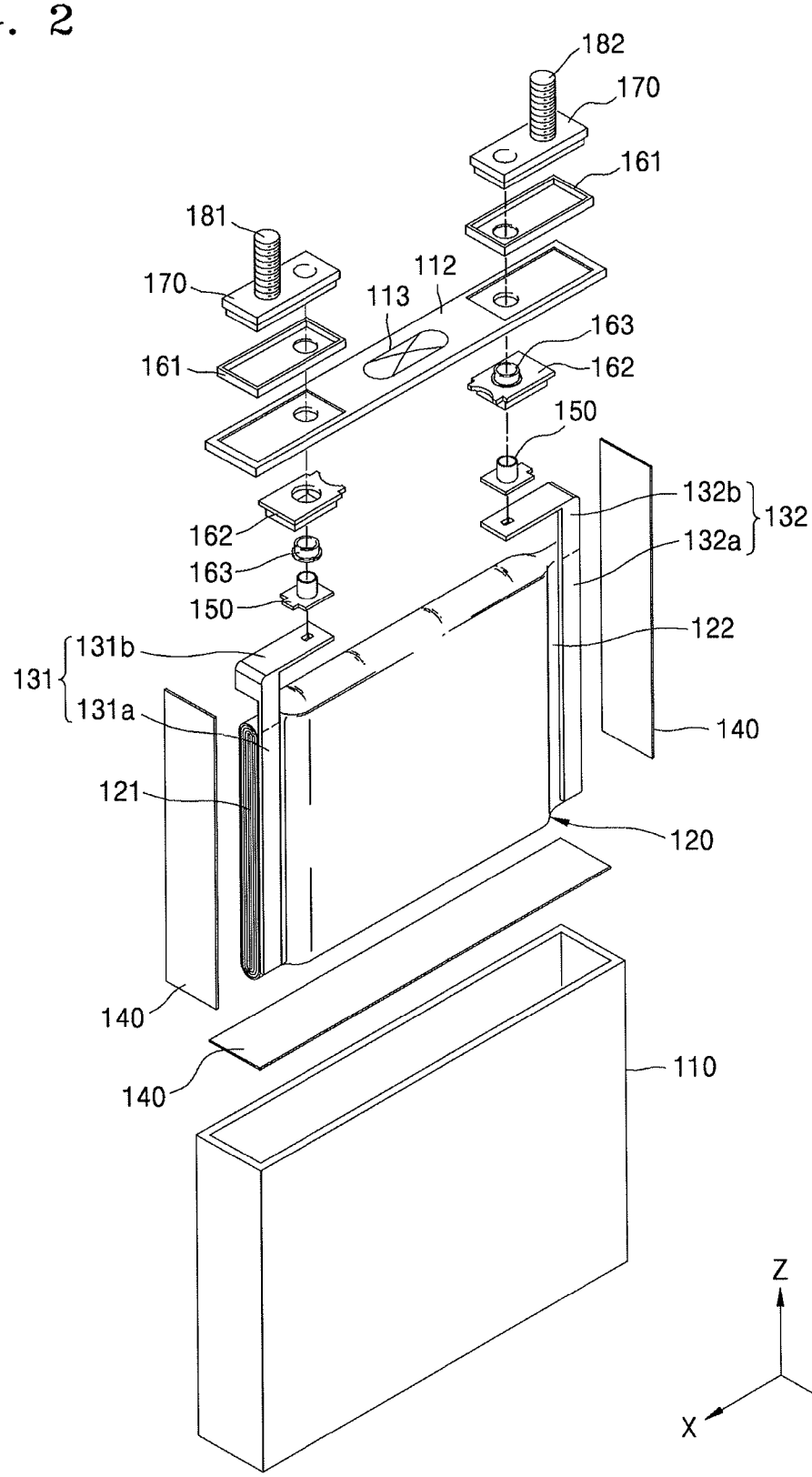
FIG. 2 illustrates a exploded perspective view of the secondary battery shown in FIG. 1.

FIG. 1 illustrates a schematic perspective view of a secondary battery according to an exemplary embodiment, and FIG. 2 illustrates an exploded perspective view of the secondary battery shown in FIG. 1.

Referring to FIGS. 1 and 2, the secondary battery 100 according to an exemplary embodiment may include an electrode assembly 120, a case 110 that accommodates the electrode assembly 120, and a cap assembly 130 that seals the top of the case 110.

Figure 3:
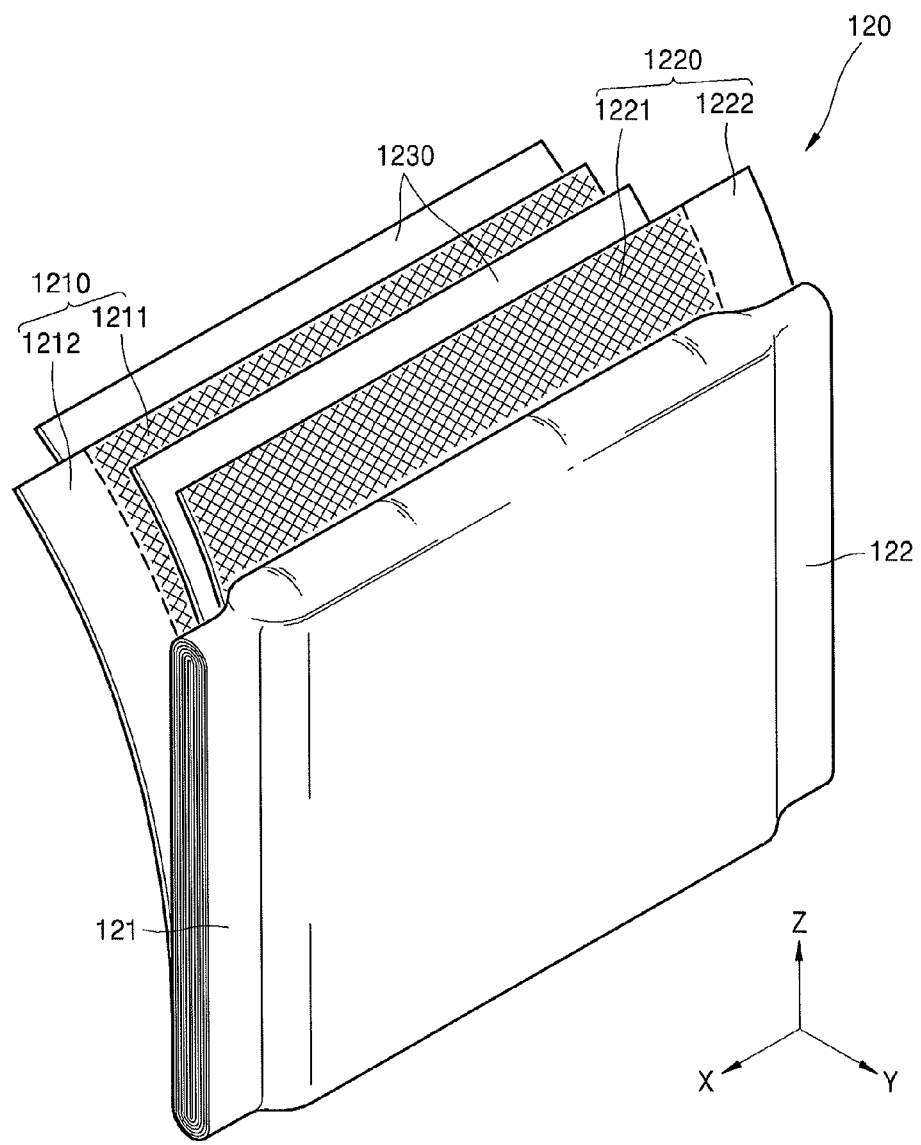
FIG. 3 illustrates a schematic perspective view of an electrode assembly of the secondary battery shown in FIG. 1.

Referring also to FIG. 3, the electrode assembly 120 may include a first electrode plate 1210, a second electrode plate 1220, and a separator 1230, which is disposed between the first and second electrode plates 1210 and 1220 of FIG. 3.

For example, the electrode assembly 120 may be formed in the shape of a jelly roll by sequentially stacking and winding the first electrode plate 1210, the separator 1230, and the second electrode plate 1220.

The electrode assembly 120 may include a first non-coating portion 121 and a second non-coating portion 122. The first and second non-coating portions 121 and 122 may be formed on respective ends of the electrode assembly 120 along the width direction of the electrode assembly 120.

The first non-coating portion 121 may be formed from the first electrode plate 1210 of FIG. 3 and may have positive polarity, and the second non-coating portion 122 may be formed from the second electrode plate 1220 of FIG. 3 and may have negative polarity. In other implementations, the first non-coating portion 121 may have negative polarity and the second non-coating portion 122 may have positive polarity.

A first current collector 131 may be electrically connected to the first non-coating portion 121, and a second current collector 132 may be electrically connected to the second non-coating portion 122. Joining of the first current collector 131 to the first non-coating portion 121 and joining of the second current collector 132 to the second non-coating portion 122 may be performed by ultrasonic welding.

The first current collector 131 may include a first overlapping portion 131a, which overlaps and joins the first non-coating portion 121, and a first connection unit 131b, which is bent perpendicular to the first overlapping portion 131a. The first connection unit 131b may be electrically connected to a first external terminal 181.

The second current collector 132 may include a second overlapping portion 132a, which overlaps and joins the second non-coating portion 122, and a second connection unit 132b, which is electrically connected to a second external terminal 182.

The first overlapping portion 131a may be formed with a predetermined length and width relative to the first non-coating portion 121. The second overlapping portion 132a may be formed with a predetermined length and width relative to the second non-coating portion 122.

For example, the length of the first overlapping portion 131a may be formed to be 30% to 70% of the length of the first non-coating portion 121, and the width of the first overlapping portion 131a may be formed to be 50% to 70% of the width of the first non-coating portion 121. The length of the second overlapping portion 132a may be formed to be 30% to 70% of the length of the second non-coating portion 122, and the width of the second overlapping portion 132b may be formed to be 50% to 70% of the width of the second non-coating portion 122.

When the first and second overlapping portions 131a and 132a are formed to have predetermined lengths and widths within the ranges described above, relative to the first and second non-coating portions 121 and 122, respectively, the resistance of the secondary battery 100 may decrease, and the high input and/or output characteristic of the secondary battery 100 may increase, as explained below with reference to FIG. 4.

The case 100 may be formed of a conductive metallic material such as aluminum, aluminum alloy, or nickel-coated steel. The case 110 may be formed roughly as a hexahedron shape having an opening for receiving the electrode assembly 120, as an example.

Inside the case 110, an electrolyte may be accommodated together with the electrode assembly 120, and the opening of the case 110 may be sealed by a cap assembly 130.

Inside the case 110, a retainer 140 may be provided in order to prevent floating movement, such as floating, of the electrode assembly 120 inside the case.

The cap assembly 130 may include a cap plate 112 to close the top of the case 110. Like the case 110, the cap plate 112 may be formed with a metallic material. A part of the cap plate 112 that is in contact with the case 110 may be laser-welded to form an airtight joint with the case 110.

On the cap plate 112, a safety vent 113, which is designed to break to provide a gas release path in case the internal pressure of the case 110 exceeds a predetermined pressure, may be formed.

On the cap plate 112, an electrolyte injection hole (not shown) to inject an electrolyte may be formed. After completing injection of an electrolyte, the electrolyte injection hole (not shown) may be closed by a sealing cap (not shown).

The first and second current collectors 131 and 132 joined to the electrode assembly 120 may be electrically connected to the first and second external terminals 181 and 182, respectively, which are provided on the cap plate 11.

The first and second current collectors 131 and 132 may be electrically connected to the first and second external terminals 181 and 182, respectively, through a rivet terminal 150 and a conductive plate 170.

For example, the first connection unit 131b of the current collector 131 may be bent in a direction toward the second non-coating portion 122 of the electrode assembly 120. The bent first connection unit 131b may be connected to the bottom of the rivet terminal 150. The top of the rivet terminal 150 may be coupled to a hole formed on the conductive plate 170 through the cap plate 112.

The rivet terminal 150 may be formed of a conductive metallic material such as aluminum or aluminum alloy. Accordingly, the first current collector 131, the rivet terminal 150, the conductive plate 170 and the first external terminal 181, which is formed on one side of the conductive plate, may form a current path.

In a similar manner as the first current collector 131, the second current collector 132, which is electrically connected to the electrode assembly 120 through welding, may be electrically connected to the second external terminal 182 through a rivet terminal 150 and a conductive plate 170.

A seal gasket 163 for preventing leakage of an electrolyte may be provided between the rivet terminal 150 and the cap plate 112. Also, a top insulator 161 and a bottom insulator 162 may be provided on the top surface and bottom surface of the cap plate 112, respectively, to prevent the first current collector 131 and the conductive plate 170 from being electrically connected to the cap plate 112.

In the present embodiment, it is shown that the seal gasket 163 is provided as a unit separate from the bottom insulator 162. In other implementations, the seal gasket 163 may be formed with the bottom insulator 162 as one body.

It is shown that the first and second external terminals 181 and 182 have a bolt shape. In other implementations, the first and second external terminals 181 and 182 may be manufactured to have other shapes, such as a rivet shape.

Figure 4:
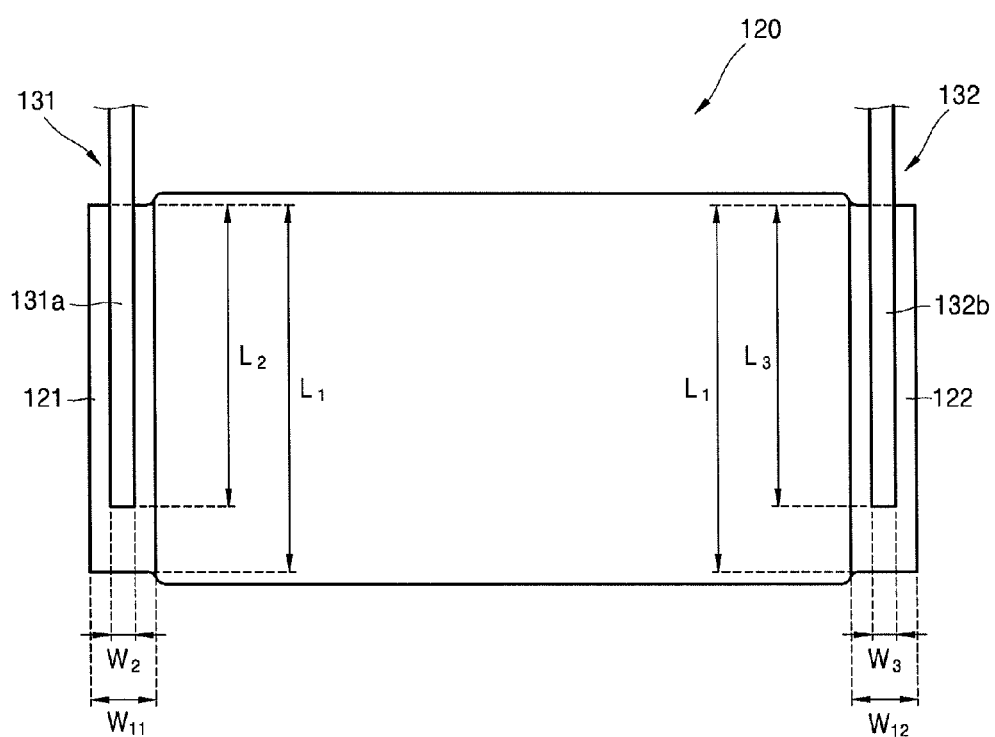
FIG. 4 illustrates a front view of an electrode assembly and a current collector of the secondary battery shown in FIG. 1.

FIG. 3 illustrates a schematic perspective view of the electrode assembly 120 shown in FIG. 1, and FIG. 4 illustrates an extracted front view of the first non-coating portion 121 of the electrode assembly 120 of FIG. 3.

Referring to FIG. 3, the electrode assembly 120 may be wound in a state where a separator 1230 is provided between a first electrode plate 1210 and a second electrode plate 1220.

The first electrode plate 1210 may include a first active material portion 1211 on which a first active material is applied, and a first uncoated area 1212 which is provided on one side of the first active material portion 1211 and on which the first active material is not applied. The first active material may be a positive electrode active material. The positive electrode active material may be applied on at least one surface of an aluminum plate to form the first active material portion 1211. By leaving a partial area of the aluminum plate in an unapplied state, the first uncoated area 1212 may be formed.

The first active material may be a transition metal oxide or PO$_4$-based metallic compound having excellent reversibility, including Li.

For example, transition metal oxides including Li may be expressed in a chemical formula of: Li$_a$Co$_{1-b}$M"$_c$O$_{2-d}$X'$_d$ (0.5≤a≤1.5, 0≤b≤0.5, 0≤c≤0.5, 0≤d≤0.5). Here, M" may be one or more selected from the group of Mg, Al, Co, Ni, K, Na, Ca, Si, Fe, Cu, Zn, Ti, Sn, V, Ge, Ga, B, P, Se, Bi, As, Zr, Mn, Cr, Ge, Sr, V, Sc, and Y. X' may be one or more elements selected from a group of F, S, and P.

PO$_4$-based metallic compounds including Li may be expressed in a chemical formula of: Li$_x$M$_y$M'$_z$PO$_{4-w}$X$_w$ (0.5≤x≤1.5, 0≤y≤1, 0≤z≤1, 0≤w≤0.2). Here, M may be one or more selected from the group of Fe, Mn, Ni, and Co. X may be one or both selected from the group of S and F.

The first active material including this material quality may have a high unique density and pressure density, and thus, may have an excellent capacity per volume to increase the capacity of the secondary battery 100 of FIG. 1.

The second electrode plate 1220 may include a second active material portion 1221, on which a second active material is applied, and a second uncoated area 1222, which is provided on one side of the second active material portion 1221 and on which the second active material is not applied. The second active material may be a negative electrode active material. For example, a negative electrode active material may be applied on at least one surface of a copper plate to form the second active material portion 1221. By leaving a partial area of the copper plate in an unapplied state, the second uncoated area 1222 may be formed.

The second active material may be one or more selected from natural graphite, artificial graphite, soft carbon (for example, low-temperature baked carbon), hard carbon, mesophase pitch carbide, and baked coke. The second active material may be, for example, soft carbon (low-temperature baked carbon) that is heat-treated at a temperature equal to or lower than 1500° C.

This second active material may be a wide surface area. Thus, the high rate capability of the secondary battery 100 of FIG. 1 may be improved.

The separator 1230 may be a porous film that prevents electrical contact between the first and second electrode plates 1210 and 1220. The separator may include polyethylene or polypropylene.

The first electrode plate 1210, the separator 1230 and the second electrode plate 1220, as described above, may be stacked sequentially, and then wound in the form of a jelly roll. Then, by applying pressure to the jelly roll, the electrode assembly 120 with an elliptic cylinder shape having flat surfaces and curved surfaces may be formed.

The first uncoated area 1212 of the first electrode plate 1210 and the second uncoated area 1222 of the second electrode plate 1220 may be provided to respective opposite sides of the separator 1230, without overlapping the separator 1230. The first uncoated area 1212 of the first electrode plate 1210 may be wound to form the first non-coating portion 121 of the electrode assembly 120, and the second uncoated area 1222 of the second electrode plate 1220 may be wound to form the second non-coating portion 122 of the electrode assembly 120.

Referring to FIG. 4, the first current collector 131 may be joined to the first non-coating portion 121, and the second current collector 132 may be joined to the second non-coating portion 122.

The first and second current collectors 131 and 132 may form a path through which electrons generated from the first and second active material portions 1211 and 1221 can flow to the outside. In addition, heat generated from the electrode assembly 120 may radiate to the outside through the first and second current collectors 131 and 132. The first and second current collectors 131 and 132 may act as a support to maintain the shape of the electrode assembly 120.

The first and second current collectors 131 and 132 may include conductive metallic materials. For example, the first current collector 131 may include aluminum or an aluminum alloy and the second current collector 132 may include copper or a copper alloy.

The length of the first overlapping portion 131a overlapping the first non-coating portion 121 may be formed to be 30% to 70% of the length L1 of the first non-coating portion 121.

If the length $L_2$ of the first overlapping portion 131a is less than 30% of the length $L_1$ of the first non-coating portion 121, the area of the first overlapping portion 131a through which electrons can flow out is reduced. Contact resistance between the first overlapping portion 131a and the first non-coating portion 121 may be increased, and the overall resistance of the secondary battery 100 of FIG. 1 may increase. Also, the joining area of the first current collector 131 is reduced, and the joining power between the first current collector 131 and the first non-coating portion 121 may be reduced.

If the length $L_2$ of the first overlapping portion 131a is greater than 70% of the length $L_1$ of the first non-coating portion 121, the internal resistance of the first current collector 131 may increase and the current characteristic may decrease. Also, if the length of the first overlapping portion 131a is similar to the length L1 of the first non-coating portion 121, the first overlapping portion 131a and the case 110 of FIG. 2 may short-circuit.

Accordingly, in order to minimize the contact resistance between the first current collector 131 and the first non-coating portion 121 and the resistance of the first current collector 131 itself, and to secure stability of the secondary battery 100 of FIG. 1, the length $L_2$ of the first overlapping portion 131a may be formed to be 30% to 70% of the length $L_1$ of the first non-coating portion 121.

The width $W_2$ of the first overlapping portion 131a may be formed as 50% to 70% of the width $W_{11}$ of the first non-coating portion 121.

If the width $W_2$ of the first overlapping portion 131a is less than 50% of the width $W_{11}$ of the first non-coating portion 121, the area through which an electric current can flow may decrease, and the contact resistance between the first overlapping portion 131a and the first non-coating portion 121 may increase.

If the width $W_2$ of the first overlapping portion 131a is greater than 70% of the width $W_{11}$ of the first non-coating portion 121, the first overlapping portion 131a and the first active material portion 1211 or the second active material portion 1221 may short-circuit. When the first overlapping portion 131a and the first non-coating portion 121 are welded, the separator 1230 may melt.

Accordingly, in order to minimize the resistance of the secondary battery 100 of FIG. 1 and thus allow the secondary battery 100 of FIG. 1 to have a high rate capability, and to secure stability of the secondary battery 100 of FIG. 1, the width $W_2$ of the first overlapping portion 131a may be formed to be 50% to 70% of the width $W_{11}$ of the first non-coating portion 121.

The length $L_3$ of the second overlapping portion 132a overlapping the second non-coating portion 122 may be formed to be 30% to 70% of the length $L_1$ of the second non-coating portion 122. The second non-coating portion 122 may be formed to have the same length $L_1$ as that of the first non-coating portion 121, and the length $L_3$ of the second overlapping portion 132a may be formed to be the same as the length $L_2$ of the first overlapping portion 132a.

The width $W_3$ of the second overlapping portion 132a may be formed to be 50% to 70% of the width $W_{12}$ of the second non-coating portion 122 in order to minimize the resistance of the secondary battery 100 of FIG. 1. For example, the width $W_{12}$ of the second non-coating portion 122 may be formed to be the same as the width $W_{11}$ of the first non-coating portion 121.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Manufacturing an Electrode Assembly 90 weight parts of mixed powder in which 85 weight parts of $LiCoO_2$ powder (manufactured by Umicore N.V.) with an average grain size of 5 μm and 5 weight parts of activated carbon powder (manufactured by Kuraray Co. Ltd.) with an average grain size of 7.5 μm were mixed, 4 weight parts of carbon black as a conductive material, and 6 weight parts of polyvinylidenefluoride as a binder were dispersed in an N-methylpyrrolidone solvent to manufacture a positive electrode active material composite slurry. The positive electrode active material composite slurry was applied on an aluminum electrode plate with a thickness of about 145 μm using a doctor blade (gap: 170 mm). The applied slurry was heat-treated and dried for 5.5 hours under a vacuum condition at 100° C. Then, the aluminum electrode plate on which the positive electrode active material composite slurry was applied was rolled by a roll press. Thus, a positive electrode plate on which a positive electrode active material layer was formed was manufactured. The positive electrode plate was cut into a strip shape with a width of 457 mm and a length of 70.0 mm.

92 weight parts of soft carbon (low-temperature baked carbon manufactured by GS Caltex), 5 weight parts of carbon black as a conductive material, 1 weight part of carboxymethyl cellulose as a viscosity agent, and 2 weight parts of styrene-butadiene rubber as a binder were dispersed in a water solvent, and then mixed to manufacture an negative electrode active material composite slurry. The negative electrode active material composite slurry was applied on a copper electrode plate with a thickness of about 140 μm using a doctor blade (gap: 160 mm). The applied slurry was heat-treated and dried for 6.5 hours in a vacuum oven at 150° C. Then, the copper electrode plate on which the negative electrode active material composite slurry was applied was rolled by a roll press. Thus a negative electrode plate on which a negative electrode active material layer was formed was manufactured. The negative electrode plate was cut into a strip shape with a width of 448 mm and a length of 70.0 mm.

A polyethylene separator was placed between the positive electrode plate and negative electrode plate, and the electrode assembly 120 of FIG. 2 was manufactured by winding the plates and separator.

Manufacturing a Secondary Battery

A first current collector and a second current collector were joined to a first non-coating portion and a second non-coating portion, respectively, of the electrode assembly manufactured as described above by ultrasonic welding. The electrode assembly was embedded in a case formed of aluminum. Then, an electrolyte in which 1.13M $LiPF_6$ was dissolved into ethylene carbonate (EC)+dimethylene carbonate (DMC)+diethylene carbonate (DEC) (volume ratio of 3:5:2) was injected into the case, and the case was sealed. Thus, the secondary battery 100 of FIG. 1 was manufactured.

EXAMPLES 1 THROUGH 4

In the examples below, the first non-coating portion 121 and the second non-coating portion 122 were formed to have the same shapes, that is, the same lengths and widths, and the first overlapping portion 131a and the second overlapping portion 132a were also formed to have the same lengths and widths. Hereinafter, the first and second overlapping portions 131a and 132a will be referred to together as the overlapping portion, and the first and second non-coating portions 121 and 122 will be referred to together as the non-coating portion.

Example 1

A current collector having a overlapping portion with a length of 30% of the length of an non-coating portion and a width of 70% of the width of the non-coating portion was manufactured, and the secondary battery was manufactured as described above.

The manufactured secondary battery was charged until the voltage reached 4.2V and then the secondary battery was discharged with a 0.3 A current until the voltage reached 2.0V, it. The capacity of the secondary battery at that time was designated as the initial capacity of the secondary battery.

Then, the secondary battery was recharged with a 0.3 A current until the voltage of the secondary battery reached 4.2V, and then, the secondary battery was discharged with a 15 A current until the voltage of the secondary battery reached 2.0V. The capacity and resistance of the secondary battery at that time were measured.

Example 2

A secondary battery was manufactured in the same manner as described in Example 1, except that the length of the overlapping portion was 50% of the length of the non-coating portion, and the width of the overlapping portion was 70% of the width of the non-coating portion. The capacity and resistance of the secondary battery were measured in the same manner as in Example 1.

Example 3

A secondary battery was manufactured in the same manner as described in Example 1, except that the length of the overlapping portion was 70% of the length of the non-coating portion and the width of the overlapping portion was 70% of the width of the non-coating portion. The capacity and resistance of the secondary battery were measured in the same manner as in Example 1.

Example 4

A secondary battery was manufactured in the same manner as described in Example 1, except that the length of the overlapping portion was 50% of the length of the non-coating portion, and the width of the overlapping portion was 50% of the width of the non-coating portion. The capacity and resistance of the secondary battery were measured in the same manner as in Example 1.

COMPARATIVE EXAMPLES 1 THROUGH 4

Comparative Example 1

A secondary battery was manufactured in the same manner as described in Example 1, except that the length of the overlapping portion was 10% of the length of the non-coating portion, and the width of the overlapping portion was 70% of the width of the non-coating portion. The capacity and resistance of the secondary battery were measured in the same manner as in Example 1.

Comparative Example 2

A secondary battery was manufactured in the same manner as described in Example 1, except that the length of the overlapping portion was 90% of the length of the non-coating portion, and the width of the overlapping portion was 70% of the width of the non-coating portion. The capacity and resistance of the secondary battery were measured in the same manner as in Example 1.

Comparative Example 3

A secondary battery was manufactured in the same manner as described in Example 1, except that the length of the overlapping portion was 50% of the length of the non-coating portion, and the width of the overlapping portion was 30% of the width of the non-coating portion. The capacity and resistance of the secondary battery were measured in the same manner as in Example 1.

Comparative Example 4

A secondary battery was manufactured in the same manner as described in Example 1, except that the length of the overlapping portion was 50% of the length of the non-coating portion, and the width of the overlapping portion was 90% of the width of the non-coating portion. The capacity and resistance of the secondary battery were measured in the same manner as in Example 1.

The following Table 1 indicates the stability, together with the results of capacity and resistance measurements of the secondary batteries of the Examples and Comparative Examples described above.

TABLE 1

| | Overlapping portion length/ Non-coating portion length | Overlapping portion width/ Non-coating portion width | %, discharge | dc-IR Resistance (mΩ) | Stability |
|---|---|---|---|---|---|
| Example 1 | 30% | 70% | 92% | 0.022 | ○ |
| Example 2 | 50% | 70% | 95% | 0.025 | ○ |
| Example 3 | 70% | 70% | 94% | 0.028 | ○ |
| Example 4 | 50% | 50% | 93% | 0.026 | ○ |
| Comparative Example 1 | 10% | 70% | 83% | 0.041 | x |
| Comparative Example 2 | 90% | 70% | 91% | 0.029 | Δ |
| Comparative Example 3 | 50% | 30% | 90% | 0.031 | Δ |
| Comparative Example 4 | 50% | 90% | 94% | 0.022 | x |

In the stability column of Table 1, '○' indicates that there were no issues with regard to stability, 'Δ' indicates that there were possible issues with respect to stability, and 'x' indicates that stability was weak.

From the Table 1, it can be seen that the secondary batteries 100 of FIG. 1 of Examples 1 through 4 showed improved discharge characteristics compared to the secondary batteries of Comparative Examples 1 through 3.

The secondary battery of Comparative Example 4 was shown to have satisfactory discharge characteristic, but, in some instances, when the overlapping portion was joined to the non-coating portion by welding, an end of the separator was melted, indicating weak stability. In the secondary battery of Comparative Example 1 the joining power of the overlapping portion was weak. In the secondary battery of Comparative Example 2, the risk of the overlapping portion being in contact with the case was increased.

By way of summation and review, the demand for high output and high capacity batteries has been rapidly increasing. For example, in a hybrid vehicle, an idle stop and go or integrated starter and generator (ISG) system is a core technology of a hybrid vehicle. These systems employ a method in which the operation of an engine is automatically stopped when a vehicle is stopped, and in which operation of the engine is restarted if driving begins by stepping on the clutch or accelerator. The ISG system can greatly reduce unnecessary fuel consumption of a vehicle in city traffic situations where vehicles repeatedly stop and start. In order to drive this ISG system which is an idling restricting device, it is desirable that its power supply device have a high input and/or output characteristic, so as to provide a high output even when the engine is repetitively restarted.

The secondary battery according to the exemplary embodiments as described above minimizes resistance, and thus has a high input and/or output characteristic. This secondary battery may be appropriately applied as a power supply device for starting an engine in an ISG system.

It should be understood that the exemplary embodiments described therein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope as set forth in the following claims.

What is claimed is:

1. A secondary battery, comprising:
an electrode assembly including a first electrode plate and a second electrode plate that are spirally wound together with respect to a winding axis, with a separator between the first electrode plate and the second electrode plate, the first electrode plate including a first coating portion on which a first active material is applied and a first non-coating portion on which the first active material is not present, the first non-coating portion being at a first end of the electrode assembly in a direction parallel to the winding axis, and the second electrode plate including second coating portion on which a second active material is applied and a second non-coating portion on which the second active material is not present, the second non-coating portion being at a second end of the electrode assembly in a direction parallel to the winding axis, wherein the separator does not overlap the first non-coating portion of the second non-coating portion;
a single first current collector joined to the first non-coating portion at the first end of the electrode assembly and a single second current collector joined to the second non-coating portion at the second end of the electrode assembly;
a case that accommodates the electrode assembly; and
a cap assembly that seals the case,
wherein the first current collector includes a first overlapping portion that overlaps and joins the first non-coating portion and a first connection unit that is bent from the first overlapping portion in a direction toward the second non-coating portion, the first overlapping portion having a length in a direction perpendicular to the winding axis and a width in the direction parallel to the winding axis, and the first non-coating portion having a length in the direction perpendicular to the winding axis and a width in the direction parallel to the winding axis, the length of the first overlapping portion being 30% to 70% of the length of the first non-coating portion and the width of the first overlapping portion being 50% to 70% of the width of the first non-coating portion, and
the second current collector includes a second overlapping portion that overlaps and joins the second non-coating portion and a second connection unit that is bent from the second overlapping portion in a direction toward the first non-coating portion, the second overlapping portion having a length in the direction perpendicular to the winding axis and a width in the direction parallel to the winding axis and the second non-coating portion having a length in a direction perpendicular to the winding axis and a width in the direction parallel to the winding axis, the length of the second overlapping portion being 30% to 70% of the length of the second non-coating portion and the width of the second overlapping portion being 50% to 70% of the width of the second non-coating portion.

2. The secondary battery as claimed in claim 1, wherein the first active material is a transition metal oxide or a $PO_4$-based metallic compound including Li.

3. The secondary battery as claimed in claim 1, wherein the second active material is soft carbon.

4. The secondary battery as claimed in claim 1, wherein:
the cap assembly includes a cap plate that seals the case,
a first external terminal and a second external terminal are located on the cap plate,
the first connection unit is electrically connected to the first external terminal, and
the second connection unit is electrically connected to the second external terminal.

5. The secondary battery as claimed in claim 1, further comprising a retainer that prevents movement of the electrode assembly inside the case.

6. A secondary battery, comprising:
an electrode assembly that is formed by winding a first electrode plate, a separator and a second electrode plate in a sequentially stacked condition, the first electrode plate including a first coating portion on which a first active material is applied and a first non-coating portion on which the first active material is not present, the first non-coating portion being at a first end of the electrode assembly in a direction parallel to the winding axis and the second electrode plate including a second coating portion on which a second active material is applied and a second non-coating portion on which the second active material is not present, the second non-coating portion being at a second end of the electrode assembly in a direction parallel to the winding axis, the first non-coating portion having a length in a direction perpendicular to the winding axis of the electrode assembly and a width in the direction parallel to the winding axis and the second non-coating portion having a length in a direction perpendicular to the winding axis and a width in the direction parallel to the winding axis;

a single first current collector that is electrically connected to the first non-coating portion at the first of the electrode assembly; and a single second current collector that is electrically connected to the second non-coating portion at another of the ends of the electrode assembly, wherein:

the first current collector includes:

a first overlapping portion that overlaps the first non-coating portion and is joined to the first non-coating portion by welding, the first overlapping portion having a length in a direction perpendicular to a winding axis and a width in the direction parallel to the winding axis; and a first connection unit that is bent perpendicular to the first overlapping portion and toward the second non-coating portion, and the second current collector includes:

a second overlapping portion that overlaps the second non-coating portion and is joined to the second non-coating portion by welding, the second overlapping portion having a length in the direction perpendicular to the winding axis and a width in the direction parallel to the winding axis; and a second connection unit that is bent perpendicular to the second overlapping portion and toward the first non-coating portion, and the length of the first overlapping portion is 30% to 70% of the length of the first non-coating portion, and the width of the first overlapping portion is 50% to 70% of the width of the first non-coating portion, and the length of the second overlapping portions is 30% to 70% of the length of the second non-coating portion, and the width of the second overlapping portion is 50% to 70% of the width of the second non-coating portion.

7. The secondary battery as claimed in claim 6, wherein:

a first uncoated area and a second uncoated area are located at opposite sides, respectively, of the separator without overlapping the separator.

8. The secondary battery as claimed in claim 7, wherein the first non-coating portion and the second non-coating portion are formed by the winding of the first electrode plate, separator, and the second electrode plate.

9. The secondary battery as claimed in claim 7, wherein the first active material includes a transition metal oxide or a $PO_4$-based metallic compound including Li.

10. The secondary battery as claimed in claim 7, wherein the second active material is one or more selected from natural graphite, artificial graphite, soft carbon, hard carbon, mesophase pitch carbide, and baked coke.

11. The secondary battery as claimed in claim 6, further comprising: a case that accommodates the electrode assembly; and a cap assembly that seals the case.

12. The secondary battery as claimed in claim 11, wherein:

the cap assembly includes a cap plate that seals the case, a first external terminal and a second external terminal are located on the cap plate, and the first connection unit is electrically connected to the first external terminal and the second connection unit is electrically connected to the second external terminal.

13. The secondary battery as claimed in claim 11, further comprising a retainer that prevents movement of the electrode assembly inside the case.

* * * * *